United States Patent
Forbes et al.

[11] Patent Number: 6,148,965
[45] Date of Patent: Nov. 21, 2000

[54] RAILCAR BRAKE ARRANGEMENT

[75] Inventors: James W. Forbes, Waterloo; Richard C. Haight, Hamilton, both of Canada

[73] Assignee: National Steel Car Limited, Canada

[21] Appl. No.: 09/122,579

[22] Filed: Jul. 24, 1998

[30] Foreign Application Priority Data

Jul. 23, 1998 [CA] Canada ................... 2243904

[51] Int. Cl.[7] ................................................ B61H 13/00
[52] U.S. Cl. ................................ 188/33; 105/3; 105/226; 303/85
[58] Field of Search ................ 188/33, 34, 47, 188/46, 52, 49, 153 R, 153 D, 153 A, 107; 303/85, 28, 7, 8, 33, 36, 38, 52, 86, 64, 66; 105/4.1, 4.3, 3, 355, 4.2, 226–229, 404–421

[56] References Cited

U.S. PATENT DOCUMENTS

| | | | |
|---|---|---|---|
| 512,233 | 1/1894 | Speed | 303/85 |
| 1,201,689 | 10/1916 | Burnett | 188/52 |
| 1,562,939 | 11/1925 | Burns | 303/85 |
| 1,696,332 | 12/1928 | Sheehan . | |
| 1,715,765 | 6/1929 | Kobayashi | 303/30 |
| 2,053,500 | 9/1936 | Sillcox | 303/81 |
| 2,079,747 | 5/1937 | Mussey et al. . | |
| 2,094,442 | 9/1937 | Blomberg . | |
| 2,183,303 | 12/1939 | Campbell | 303/30 |
| 2,841,447 | 7/1958 | Cotter | 303/81 |
| 3,042,456 | 7/1962 | Alfieri | 303/30 |
| 3,357,371 | 12/1967 | Gutridge . | |
| 4,091,742 | 5/1978 | Cordani | 105/366 |
| 4,456,413 | 6/1984 | Pavlick | 410/56 |
| 4,543,887 | 10/1985 | Baker . | |
| 4,599,949 | 7/1986 | Hill | 105/355 |
| 4,648,764 | 3/1987 | Pavlick . | |
| 4,686,907 | 8/1987 | Woollam et al. | 105/4.1 |
| 4,703,699 | 11/1987 | Hill | 105/355 |
| 4,750,431 | 6/1988 | Yates et al. . | |
| 4,771,706 | 9/1988 | Lindauer et al. | 105/415 |
| 4,782,762 | 11/1988 | Johnstone et al. | 137/355 |
| 4,841,876 | 6/1989 | Gramse et al. . | |
| 4,862,810 | 9/1989 | Jamrozy et al. | 105/355 |
| 5,054,403 | 10/1991 | Hill et al. . | |
| 5,216,285 | 6/1993 | Hilsenteger et al. . | |
| 5,279,230 | 1/1994 | Thomas et al. | 105/355 |
| 5,423,269 | 6/1995 | Saxton et al. | 105/355 |
| 5,465,670 | 11/1995 | Butcher . | |
| 5,743,191 | 4/1998 | Coslovi . | |

*Primary Examiner*—Douglas C. Butler
*Attorney, Agent, or Firm*—Oldham & Oldham Co., LPA

[57] ABSTRACT

An articulated railcar has several well car units for carrying shipping containers, highways trailers, or a combination of the two. The well car units permit the nose of a long highway trailer to overhang the articulated connection between two adjacent cars. A brake valve is located in a relief formed in the main bolster of one of the articulated units, out of the way of the overhanging trailer. Each well car unit has a side beam having a roll formed top chord reinforced by a top chord plate, a downwardly extending web, and a lower sill formed of a thick angle. The service, or auxiliary, and emergency brake reservoirs are mounted in a saddle bag configuration to the outside face of the webs of the opposite side beams of the articulated unit, tucked underneath the reinforced roll formed top chord.

15 Claims, 11 Drawing Sheets

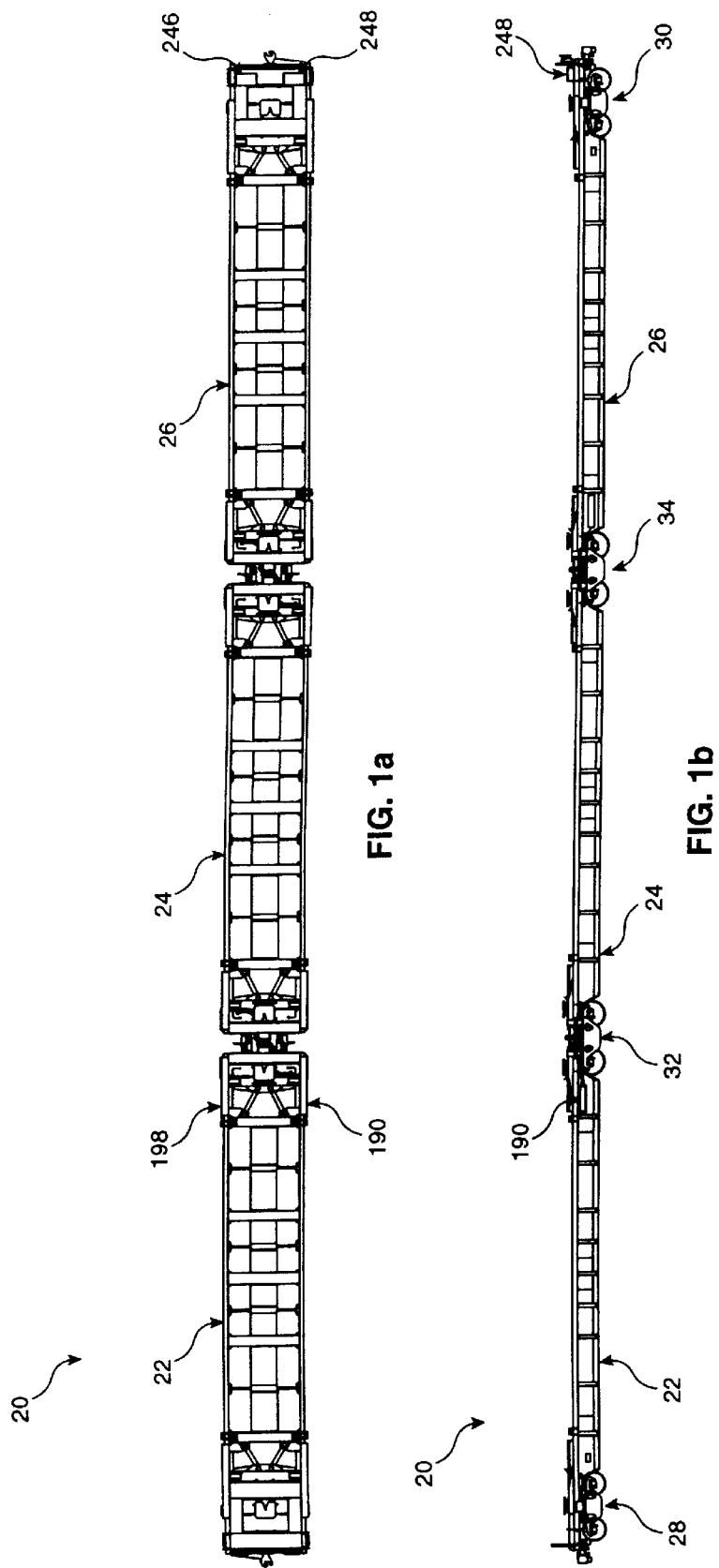

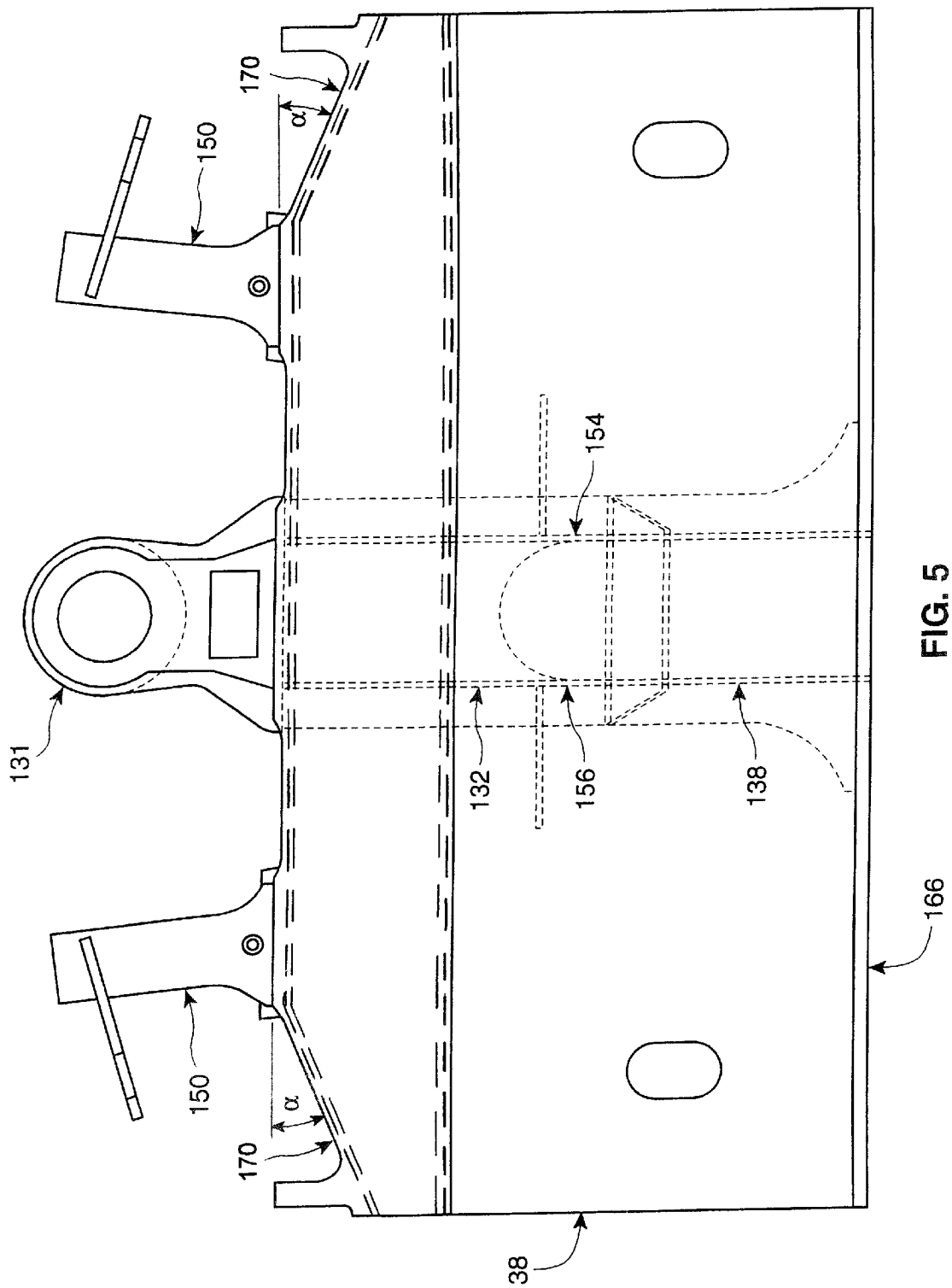

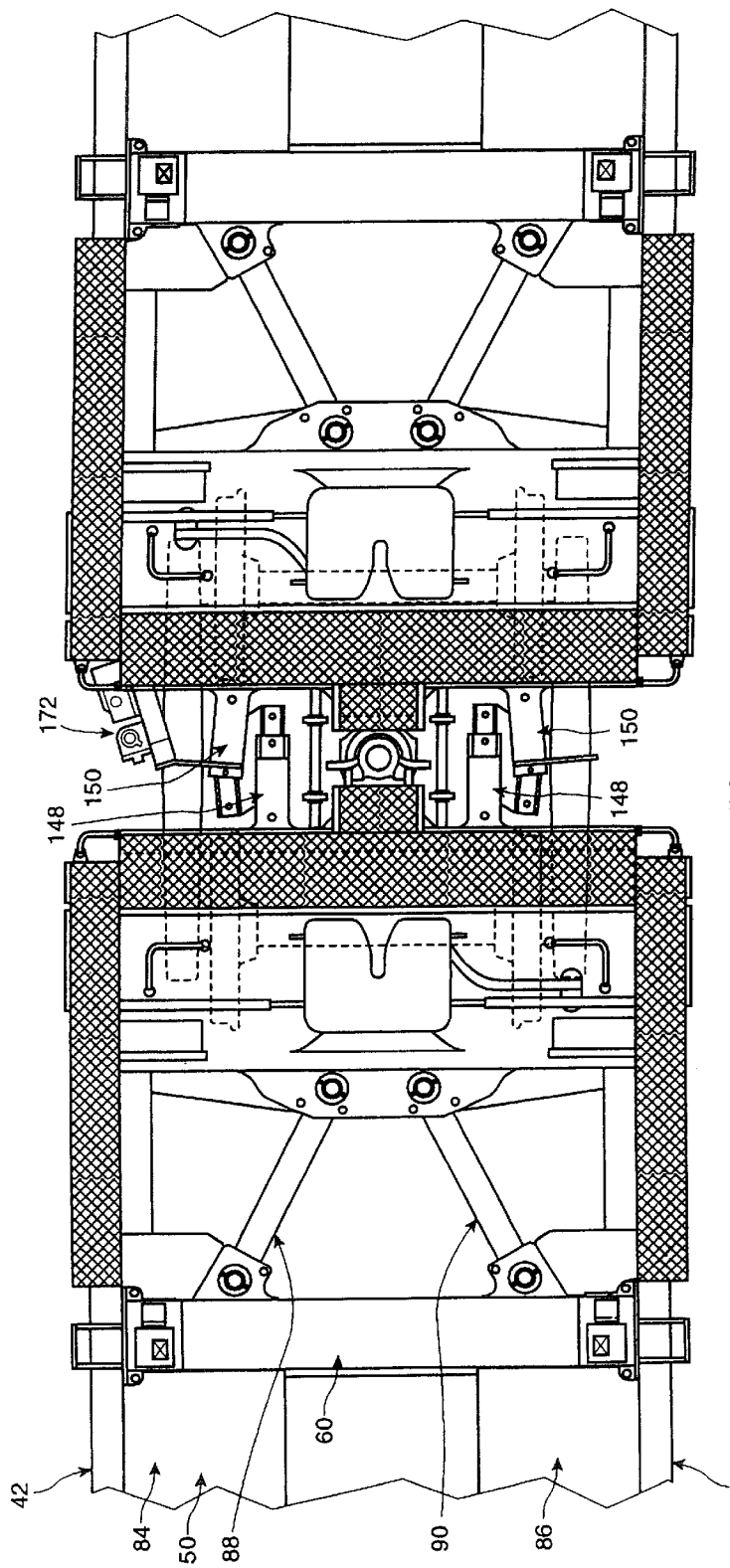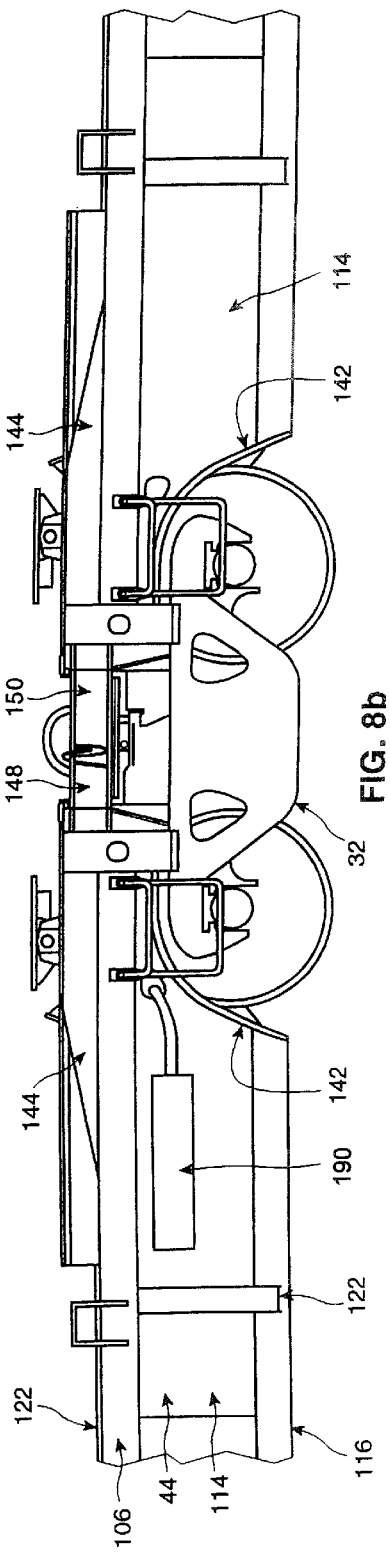
FIG. 8a
FIG. 8b

RAILCAR BRAKE ARRANGEMENT

FIELD OF THE INVENTION

This invention relates to improvements in the structure of well cars, and in particular to the braking system of those cars.

BACKGROUND OF THE INVENTION

Railway well cars may be considered as upwardly opening U-shaped channels of a chosen length, simply supported on a pair of railcar trucks. Although single unit well cars are still common, there has been a trend in recent years toward articulated, multi-unit railcars which increase the number of containers per unit length of train. Further, articulated cars are cheaper to build and maintain per container slot.

Contemporary well cars may carry a number of alternative loads made up of containers in International Standards Association (ISO) sizes or domestic sizes, and of highway trailers. The ISO containers are 8'-0" wide, 8'-6" wide, and come in a 20'-0" length weighing up to 52,900 lbs., or a 40'-0" length weighing up to 67,200 lbs. Both stand-alone and articulated well cars can be all-purpose trailer on flat car ("TOFC") or container on flat car ("COFC") railcars. This means that they can carry both containers and trailers or containers only. Domestic containers are 8'-6" wide and 9'-6" high. Their standard lengths are 45', 48' and 53'. All domestic containers have a maximum weight of 67,200 lbs. Recently 28' long domestic containers have been introduced in North America. They are generally used for courier services which have lower lading densities. The 28' containers have a maximum weight of 35,000 lbs.

Two common sizes of highway trailers are, first, the 28' pup trailer weighing up to 40,000 lbs., and second, the 45' to 53' trailer weighing up to 60,000 lbs. for a two axle trailer or up to 90,000 lbs. for a three axle trailer. It is advantageous to provide well cars with TOFC and COFC hitches at both ends. This permits either a single 53' three axle trailer or, or two back-to-back 28' pup trailers to be loaded. The wheels of a trailer can rest in the well, with the front of the trailer overhanging decking at one end or the other of well car unit. A second trailer may rest in the well facing in the opposite direction. Alternatively shipping containers, typically of 20 ft., 28 ft, or 40 ft lengths, may be placed in the well, with other shipping containers stacked on top. Further, well cars may carry mixed loads of containers and trailers.

When a long highway trailer rests in the well of one unit of a multiple unit articulated well car, the nose of the trailer is held in a king pin mount on the end structure of that same unit, and can overhang both the articulated connection and part of the end structure of the adjacent well car unit. Larger highway trailers usually imply larger loads. A deep side beam can generally carry a greater load than a shallow beam. Deep side beams generally yield a relatively deep well. A higher load capacity also tends to require the use of a larger, 38 inch wheel truck, and a deeper end structure. The result is that the clearance from the top of the end structure of each well car unit to the underside of the nose of the highway trailer may be relatively small. For example, in the well car described herein, the design clearance is about 5.5 inches above the bolsters and running boards. The clearance above the shear plate is greater, approximately 13 inches plus a small amount. The versatility of a well car is improved if the well is designed to receive highway trailers of most common sizes. Similarly, the structure of the well car unit is generally designed not to foul a design envelope defined by the extent of the sizes of the overhanging noses of highway trailers whose wheels can be received in the well, whether in terms of height or width.

A standard AAR brake reservoir is a cylindrical steel tank approximately 16 inches in diameter and 34 inches long. The reservoir has an internal curved plate which divides the cylinder into two compartments. One compartment is an auxiliary compartment for containing compressed air used for service brake applications. The other compartment is an emergency compartment, also for containing compressed air, and is used in emergency brake applications when more rapid braking is required. Both the brake valve and the brake reservoir are too large to fit within the 5.5 inch height restriction of the well car described herein, beneath the nose of the overhanging trailers.

A compressed air trainline is formed when the cars of the train are coupled together. Compressed air from the locomotives is supplied through the trainline to charge the various reservoirs. The normal charge in the reservoirs is 90 p.s.i.g. When the locomotive engineer applies the brakes under normal service conditions, pressure is bled down from the train line, to 85, 80 or 75 p.s.i.g., for example. This causes the brake valve in each successive car to bleed pressure from the auxiliary reservoir to the car's brake cylinder or cylinders to match the lowered pressure in the trainline. The air bled from each auxiliary reservoir is bled to its respective brake cylinder, and causes the brakes to be applied, either gently or more firmly depending on the pressure level selected by the locomotive engineer. In normal operation it takes a significant length of time for the signal of the pressure drop in the train line to reach the last car in the train, and for the pressure to stabilize at the particular value selected by the train locomotive engineer.

The brake valve will only open the emergency reservoir when the pressure drop in the trainline is large and rapid. It is desirable that an emergency signal travel down the trainline more quickly than in normal operation. When emergency operation is selected to "dump" the trainline, the brake valve not only causes both the auxiliary and emergency reservoirs to be opened to the brake cylinders, but also causes a valve to vent the trainline to ambient at that specific car, rather than having to drain all the way back to the locomotive. The rapidity of the emergency brake response is then a function of the distance between the valves that vent, or "dump", the trainline to ambient. The American Association of Railroads (AAR) standard S-401-92 requires that the length of brake pipe between any two adjacent control valves not exceed 175 feet, to give desired emergency brake performance. A more equal spacing of the brake valves leads to a more even time lapse between successive brake valve actualizations and hence a more uniform brake application from one car to the next. The term "uniform" means that there is less time delay in the brake application from one car to the next. This in turn results in less slack action in the train.

Traditionally, brake valves and brake reservoirs have been located on top of the end structure of the articulated well car units. The need to maintain clearance from the noses of the highway trailers, as noted above, requires a different placement. One alternative is to locate the brake valve in the space between the car units, above an articulation truck. However, the space available tends to be limited by the requirement that the cars be able to follow a 180' bend radius.

In light of the foregoing, there is a need for a multiple unit articulated railcar that can satisfy the twin requirements that the brake valves and brake reservoirs not interfere with overhanging highway trailers that can fit in the very restrictive space between adjacent intermediate units and that they not be separated by more than 175 feet.

The U-shaped section of the car is generally made up of a pair of spaced apart left and right hand side beams, and structure between the side beams to hold up whatever load is placed in the well, and to carry shear between the beams under lateral loading conditions.

In earlier types of well car the side beams tended to be made in the form of a single, large beam. While simple in concept, they were often wasteful, having a large weight of material in locations where stress may have been low. It is advantageous to design a sill in the form of a hollow section, of relatively thin walls, and to provide local reinforcement where required. It is also advantageous that the hollow section be formed at the mill as a hollow tube or roll-formed section where possible, rather than welded. This often yields a saving in effort, may permit the use of a higher yield stress steel, and may also reduce the number of stress concentrations in the resulting structure. As the wall thickness decreases the prospect of buckling under buff loads increases, and measures to increase stiffness and hence to increase the buckling load would be advantageous. It would also be advantageous to provide protection for the sills to discourage damage to the sills due to clumsy loading of trailers or containers.

In the past one method of dealing with areas of higher flange stresses in the side construction stress concentration was to use a member of greater weight. As the thickness of structural members is reduced it would be advantageous to transfer loads from the railcar trucks to the bolsters, and thence to the side sills, more smoothly to discourage or reduce stress concentrations. One way to do this is to increase the depth of section at the bolster, with a consequent increase in height of the end decking.

SUMMARY OF THE INVENTION

In a first aspect of the present invention there is a main bolster for an articulation connection end of a railcar unit of an articulated railcar. The bolster is positionable to extend laterally to both sides of a central sill for mounting an articulation connector, and the bolster has a relief formed therein for accommodating a brake valve.

In an additional feature of that aspect of the invention the bolster has a distal end most distant from the center sill, and a foremost side for placement generally facing a main bolster of an adjacent railcar unit. The relief is formed in the foremost side adjacent the distal end. In a further additional feature bolster has a tapered portion is adjacent its tip.

In another aspect of the invention there is a railcar unit of an articulated railcar. The railcar unit has at least one articulation connection end. The railcar unit comprises a sill for mounting an articulated connector, and a main bolster having arms extending laterally from the sill. At least one of the arms has a relief formed therein for accommodating a brake valve.

In an additional feature of this aspect of the invention, the articulated end includes a shear plate mounted below the bolster, a lateral reinforcement mounted to the shear plate, and a pair of protruding load bearing arms extending longitudinally therefrom on either side of the sill. The relief is located outboard of one of the load bearing arms. In a further additional feature, the reinforcement is mounted above the bolster and the reinforcement has another relief corresponding to the relief of the bolster.

In a further additional feature of that aspect of the invention, the railcar unit is a well car unit. It has a well in which the wheels of a highway trailer can be placed with the nose of the highway trailer overhanging the articulation connection end in a space defined as a clearance envelope. The brake valve is mounted at least partially within the relief with all of the brake valve lying outside the envelope.

In a further additional feature of that aspect of the invention, the railcar unit further comprises a pair of longitudinal side walls. It has emergency and service reservoirs for its brakes. At least one of the service brake and emergency reservoirs is mounted to one of the side walls. In a further feature of that additional feature, the service reservoir is mounted to one of the side walls and the emergency reservoir is mounted to the other side wall.

In an alternative additional feature of that aspect of the invention, the railcar unit has a pair of end structures each for mounting to a railcar truck, and a pair of side beams extending between the end structures. Each of the beams has a top chord and a lower sill. A brake valve is mounted at least partially within the relief. Service and emergency brake reservoirs are connected to the brake valve and mounted to at least one of the beams.

In a further additional alternative feature of that aspect of the invention, each of the top chords is formed of a hollow section having an inboard portion and an outboard portion. Each beam has a web connected between the inboard portion and the lower sill. The web has an outboard face. At least one of the service and emergency reservoirs is mounted to one of the outboard faces and is at least partially overhung by the top chord.

In a further alternative additional feature of the invention the railcar unit is a well car unit having a well for receiving the wheels of a highway trailer, such that the nose of the highway trailer overhangs the articulation connection end to define a highway trailer clearance envelope. The railcar unit has a brake valve mounted to lie at least partially within the relief. All of the brake valve lies outside the envelope. The railcar unit has a service brake reservoir and an emergency brake reservoir mounted thereto outside the envelope.

In another alternative additional feature of that aspect of the invention, the railcar unit is a well car unit. It has a well for receiving the wheels of a highway trailer, such that the nose of that highway trailer overhangs said articulation connection to define a highway trailer clearance envelope. The well car unit has a pair of end structures each for mounting to a railcar truck. A pair of side beams extend between the end structures. Each of the beams has a top chord, a lower sill, and a web extending between the top chord and the lower sill. Each web has an outboard face. A brake valve is mounted to the railcar unit at least partially within the relief and completely outside the envelope. A service brake reservoir is connected to the brake valve and mounted to the outboard face of one of the webs. An emergency brake reservoir is connected to the brake valve and mounted to the outboard face of the other web. The top chord of one beam at least partially overhangs the service brake reservoir. The top chord of the other beam at least partially overhangs the emergency reservoir.

In another aspect of the invention, there is a well car unit of an articulated railcar. It comprises a pair of end structures, at least one of the end structures being an articulation connection end for connection to an articulation truck. It has a well capable of receiving the wheels of at least one size of highway trailer, the size of the noses of the sizes of highway trailer which the well is capable of receiving defining a nose overhang clearance envelope relative to said articulation connection end. The railcar includes a brake cylinder for actuating the brake of said well car unit. A brake valve is connected to control the brake cylinder and is mounted to the well car unit within half the length of the well car unit from the articulation connection end. A service brake reservoir is connected to the brake valve. An emergency brake reservoir is connected to the brake valve. The service and emergency brake reservoirs are mounted to the well car unit to lie outside the envelope.

In an additional, alternative feature of that aspect of the invention, the well car unit has a pair of side beams extending longitudinally between the end structures to define sides of the well. The service reservoir is mounted to one of the sides and the emergency reservoir is mounted to the other.

In a further alternative additional feature of that aspect of the invention, the well car unit has a pair of side beams extending longitudinally between the pair of end structures to define sides of the well. The beams have an outboard face. The service reservoir is mounted to the outboard face of one of the beams and the emergency reservoir is mounted to the outboard face of the other. In a further alternative feature of that additional feature, each of the beams has a top chord, a lower sill and a web joining the top chord and the lower sill. The top chord overhangs the one of the service and emergency reservoirs mounted to the beam.

In a further alternative additional feature of that aspect of the invention, the brake valve is mounted to one of the end structures and the reservoirs are mounted to the well car unit closer to the brake valve than to the other end structure.

In a still further aspect of the invention, there is an articulated railcar having at least two articulated railcar units sharing an articulation truck and each having an articulation connection end connected to the truck. At least one of the railcar units is a well car unit. It has a well, and a pair of end structures at opposite ends of thereof. The well is capable of receiving the wheels of at least one size of highway trailer. The sizes of the noses of the sizes of highway trailer which the well is capable of receiving define a nose overhang clearance envelope relative to the articulation connection ends of the railcar units. At least one of the railcar units has a brake cylinder for operating a brake of the railcar. At least one of the railcar units has a brake valve connected to control operation of the brake cylinder. The brake cylinder valve is mounted to the one railcar unit less than half the length of that railcar unit from the articulation connection end. At least one of the railcar units has a service brake reservoir connected to the brake valve. At least one of the railcar units has an emergency brake reservoir connected to the brake valve. The brake valve, service brake reservoir and emergency brake reservoir are all mounted to the railcar in positions lying outside the envelope.

In an additional feature of that aspect of the invention, the railcar has another brake valve mounted thereto less than 175 feet from the other brake valve.

In a still further aspect of the invention, there is a railcar unit comprising a pair of ends mounted to railcar trucks, and intermediate structure connecting the. A service brake reservoir and an emergency brake reservoir are separately mounted to the railcar unit.

In an alternative, additional feature of that aspect of the invention, the intermediate structure includes a pair of side walls extending longitudinally between the ends. The service and emergency brake reservoirs are each mounted to one of the side walls. In a further, additional alternative feature, the service brake reservoir is mounted to one of the sidewalls and the emergency brake reservoir is mounted to the other.

In yet another further aspect of the invention, there is an articulated railcar having at least two articulated railcar units. Each of the units has an articulation connection end. Each of the ends has a central sill and an articulated connector mounted therein. The railcar units share a railcar truck to which the articulated connectors are mounted. Each unit has a main bolster extending laterally of its respective central sill. At least one of the bolsters has a relief formed therein to accommodate a brake valve between the bolsters.

BRIEF DESCRIPTION OF THE DRAWINGS

For a better understanding of the present invention and to show more clearly how it may be carried into effect, reference will now be made by way of example to the accompanying drawings, which show an apparatus according to the preferred embodiment of the present invention and in which:

FIG. 1a is a plan view of an articulated railcar having three articulated well car units.

FIG. 1b is a side view of the articulated railcar of FIG. 1a.

FIG. 1c is an enlarged plan view of one end unit of the railcar of FIG. 1a.

FIG. 5 shows a partial plan view near the connector end of a railcar unit as shown in FIG. 1a.

FIG. 6 shows an end view of the skeleton of the end structure of the railcar of FIG. 1a.

FIG. 8a shows an enlarged plan view of a portion of the railcar of FIG. 1c.

FIG. 8b shows an enlarged side view of a portion of the railcar of FIG. 1c.

DETAILED DESCRIPTION OF THE PREFERRED EMBODIMENT

Figure 1C:
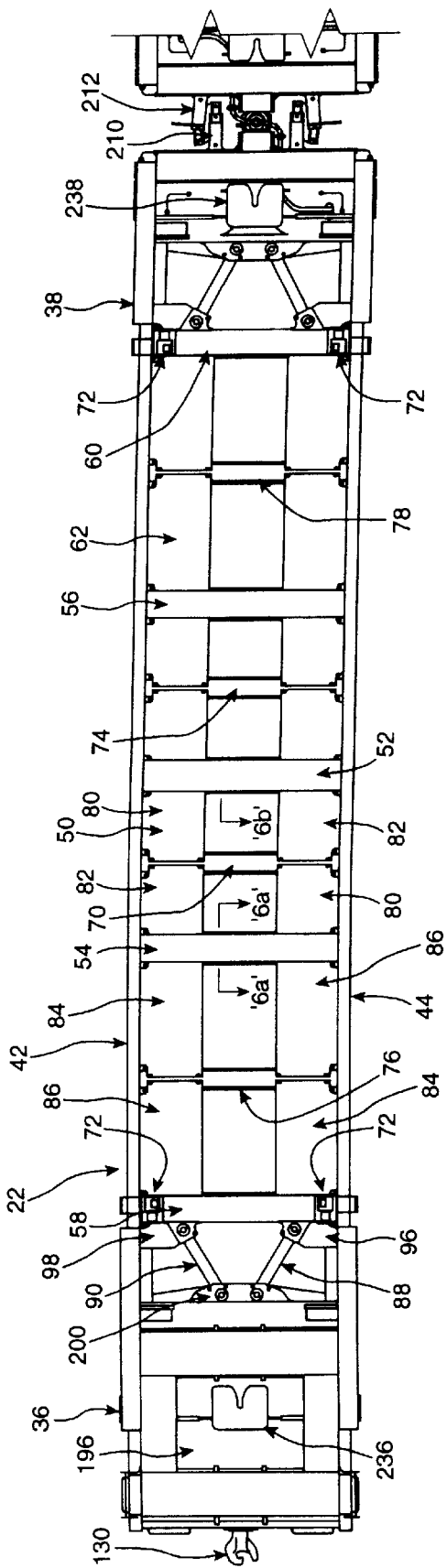

The description of the invention is best understood by reference to the Figures, in which some proportions have been exaggerated for the purposes of conceptual illustration. Referring to FIGS. 1a and 1b, an articulated rail car is shown generally as 20. It is made up of three articulated well car units, a first end unit 22, an intermediate unit 24 and a second end unit 26 supported on a pair of standard end trucks 28 and 30, and a pair of articulated trucks 32 and 34 located between units 22 and 24, and between units 24 and 26 respectively.

End unit 22 has a connector end structure, indicated generally as 36, an articulation end structure indicated generally as 38, and a well structure, indicated as 40, extending between them. Well structure 40 has a pair of opposed side members in the nature of left and right hand beam assemblies 42 and 44, held apart by a floor assembly 50. Floor assembly 50 includes a central cross beam such as cross beam 52 of floor assembly 50. Other cross beams include a pair of medial cross beams are shown as 54 and 56 and a pair of end cross beams 58 and 60. Between pairs of cross beams floor assembly 50 has H-shaped force resolvers 62 and 64 each having a force resolver cross member 70 connected to side beam assemblies 42 and 44 respectively.

Figure 1D:
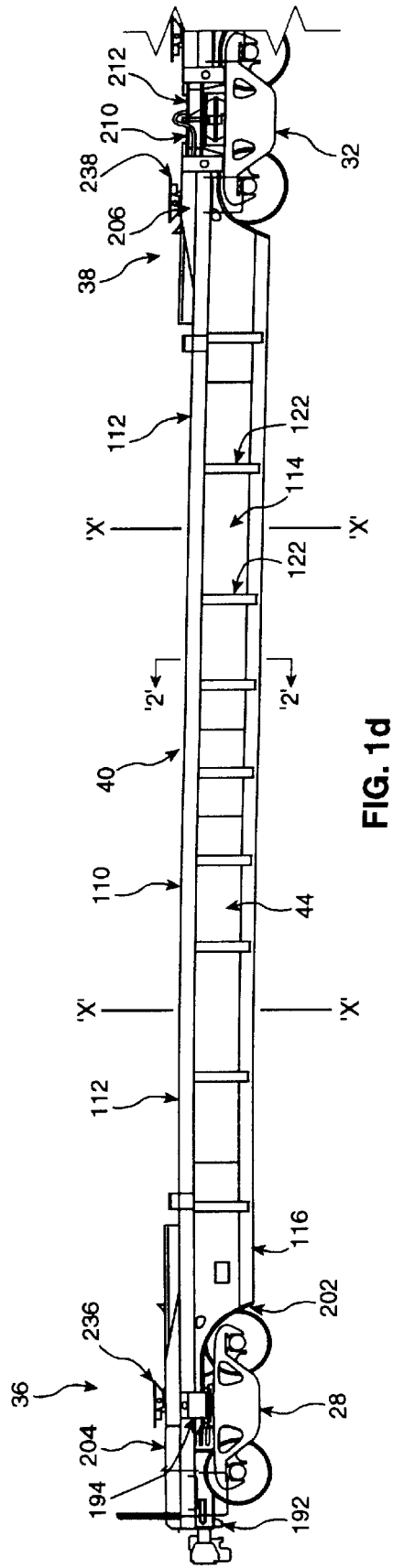
FIG. 1d is an enlarged side view of the end unit of FIG. 1c.

For the purposes of the present disclosure the floor assemblies shown are all the same, whether considering the multiple unit articulated railcar of FIGS. 1a and 1b, or the single unit well car of FIGS. 1c and 1d. Referring to floor assembly 50 of unit 22, the spacing between main cross beam 52 and 28' medial cross beams 54 and 56 is unequal to the spacing between 28' medial cross beams 54 and 56 and 40' end cross beams 58 and 60. Four ISO 40' container cones located on 40' cross beams 58 and 60 are indicated as 72. The unequal pitch of the cross members is such that the well structure 40 can accommodate either two ISO 20' containers, each with one end located on cones 72, a single 40' ISO container, also located on cones 72, a single 45' domestic container or a single 48' domestic container. Depending on the configuration of container carried in well structure 40, unit 22 is designed also to support an upper, stacked 40' ISO container, or single stacked 45', 48' or 53' domestic containers.

Force resolver cross members 70, 74, 76, and 78 are located midway between each successive pair of cross beams. They have either short floor panels, left handed ones designated as 80 and right handed ones as 82, or long floor panels, left and right handed ones designated as 84 and 86, respectively, welded to them. Four floor panels are generously welded to each cross member to form the H-shape shown. At each end of floor assembly 50 there is a pair of load spreading struts 88 and 90. They transfer longitudinal loads between end structures 36 and 38 and side beam assemblies 42 and 44 through end cross beams 58 and 60. Left and right hand cross beam socket fittings 92 and 94 receive the ends of struts 88 and 90. Finally, at either end of floor assembly 50 left and right hand floor panel extensions 96 and 98 are located between socket fittings 92 and 94 and side sill assemblies 42 and 44. Floor panel extensions 96 and 98 permit a 53' trailer to be carried in well structure 40.

Figure 2:
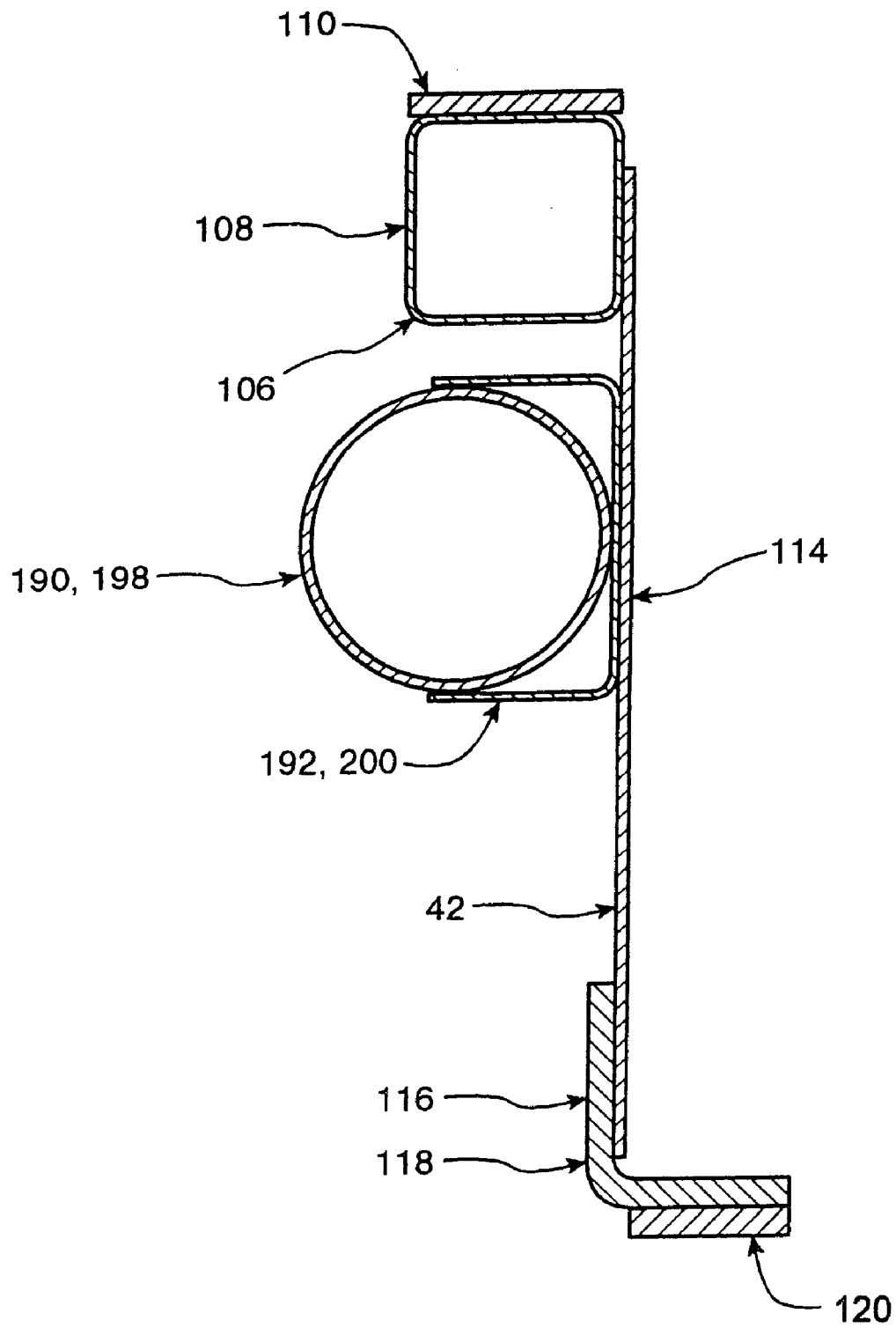
FIG. 2 shows a cross section of a side beam of the end unit of FIG. 1d taken on '2—2'.
Figure 3A:
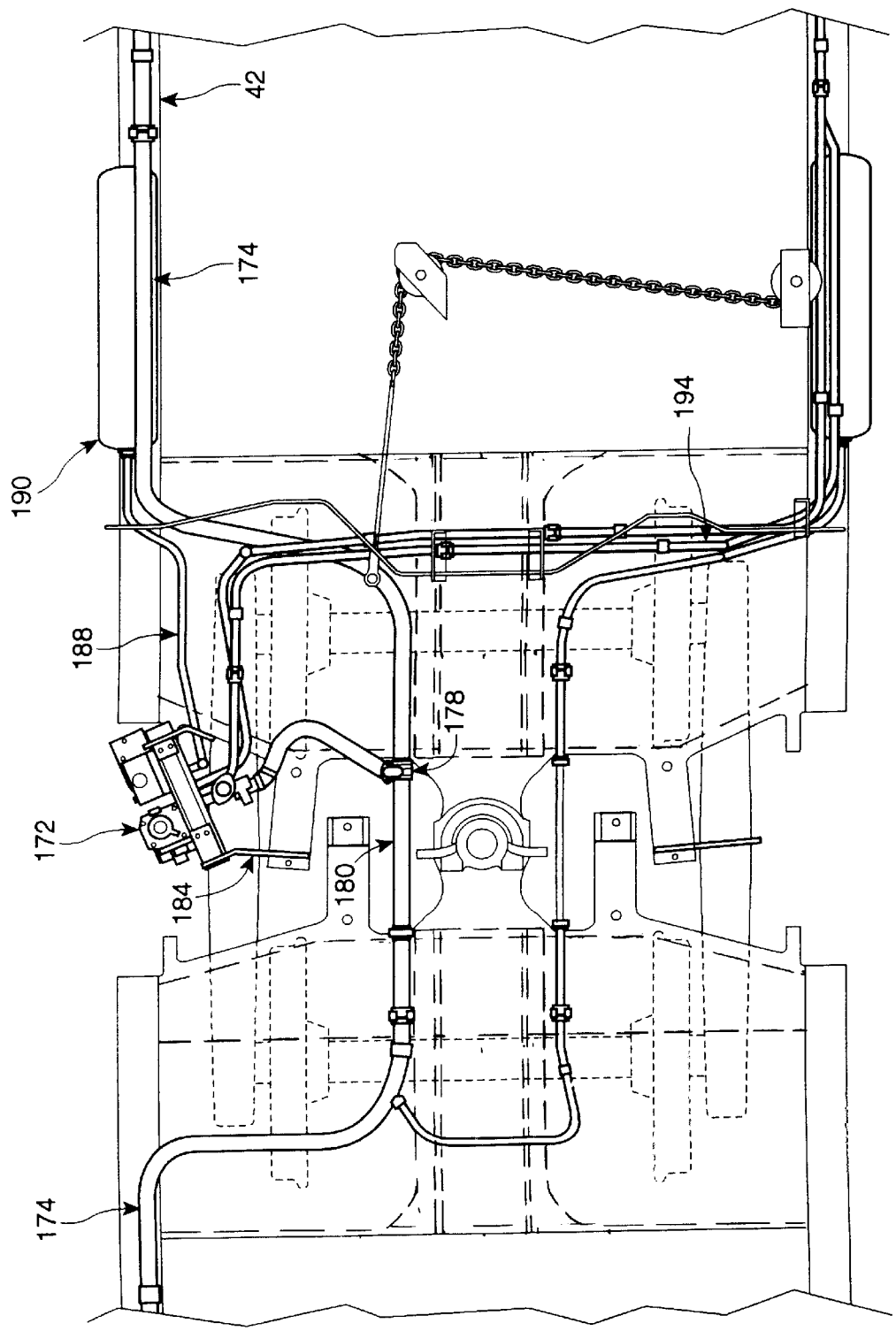
FIG. 3a shows a plan view of brake lines for the railcar of FIG. 1a at the articulation end of the railcar unit, with railcar structure shown in dashed lines.
Figure 3B:
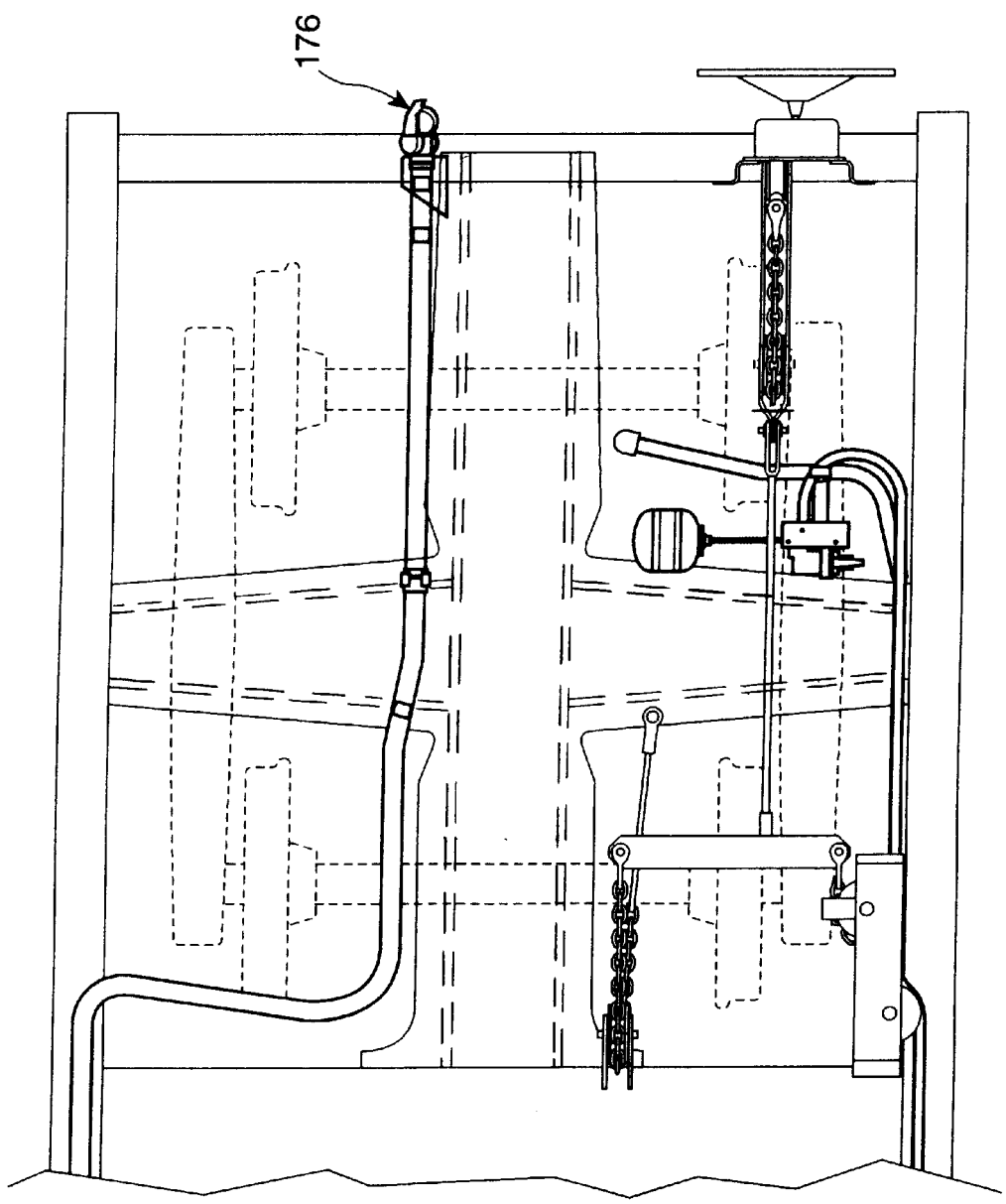
FIG. 3b shows a plan view of brake lines for the railcar of FIG. 1a at the connection end of the railcar unit, with railcar structure shown in dashed lines.
Figure 4A:
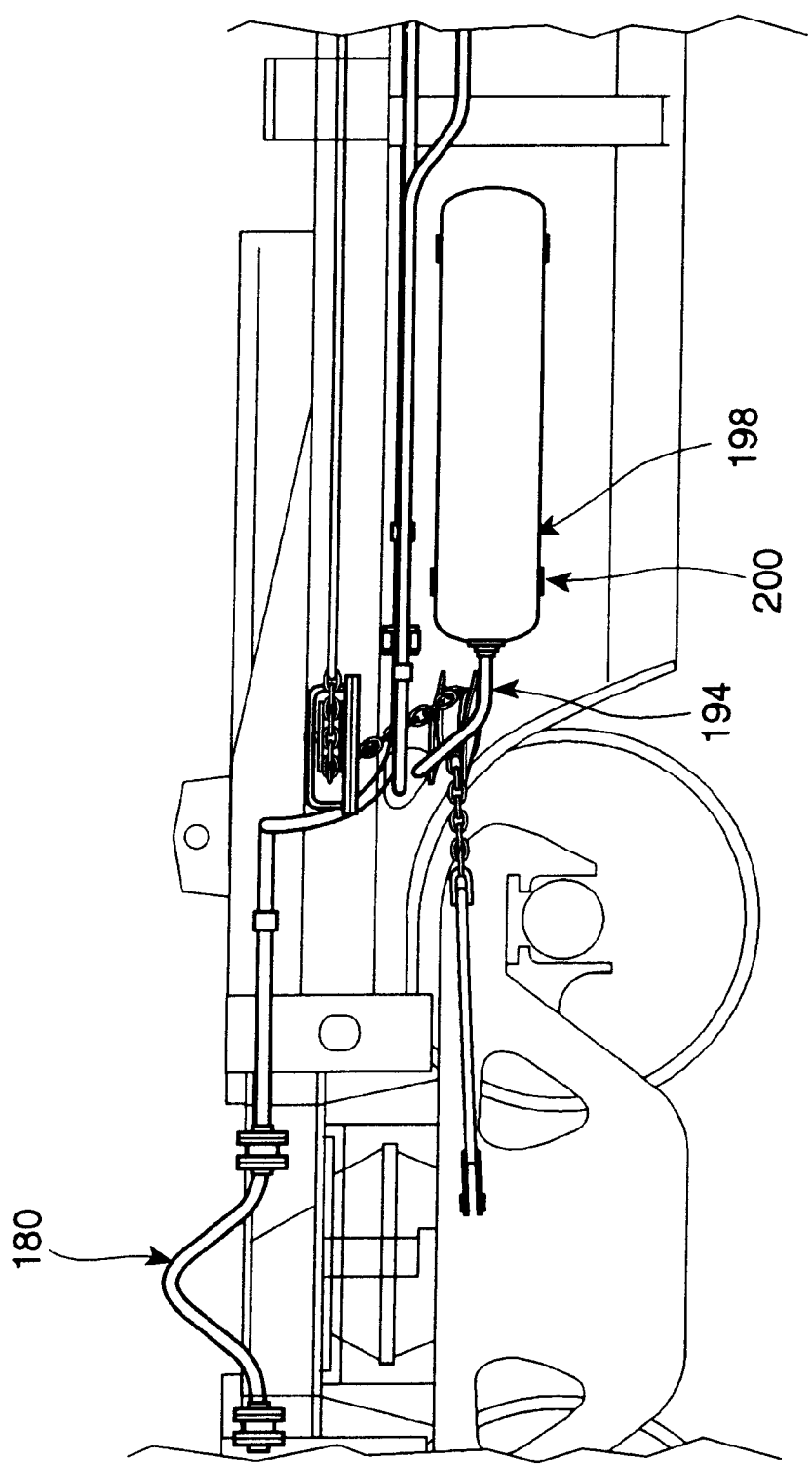
FIG. 4a shows a side view of brake lines for the railcar of FIG. 1a at the articulation end of the railcar unit, with railcar structure shown in light phantom lines.
Figure 4B:
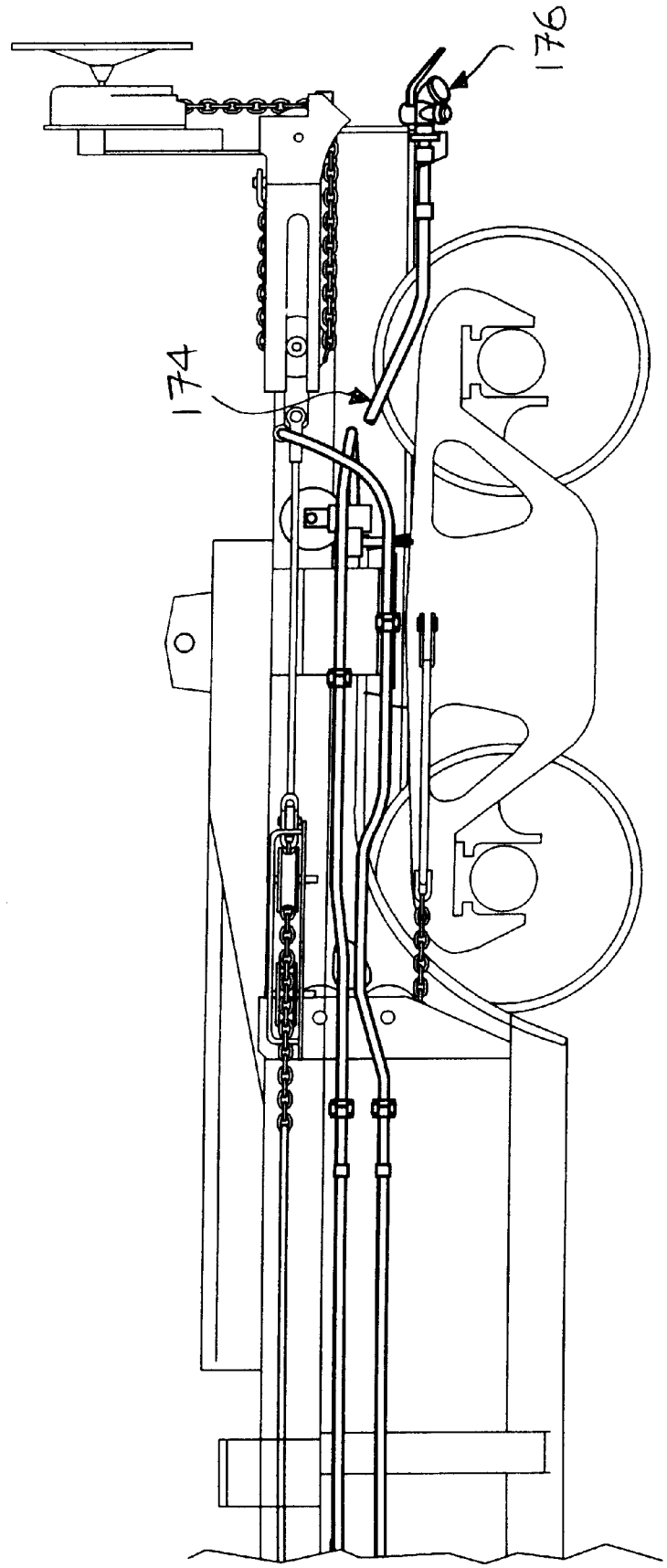
FIG. 4b shows a side view of brake lines for the railcar of FIG. 1a at the connection end of the railcar unit, with railcar structure shown in light phantom lines.

Side beam assembly 42, identical to side beam assembly 44, has a top chord member 106 in the form of a hollow sectioned, square steel tube 108 surmounted by a 1 inch thick top chord plate 110, with fillet welds all along the seams. At each section 'X—X' shown in FIG. 1d plate 110 is supplanted by a thinner, ½ inch thick plate 112. Returning to FIG. 2, a web 114 is mounted to, and extends downwardly from, a lap joint against the inner face of square steel tube 108 to meet lower side sill 116 in the form of a ½ inch thick angle iron 118 having a 7⅜ inch vertical leg and a 7 inch inwardly extending toe. A ½ inch thick reinforcement 120 is welded to the lower face of the toe of angle iron 118. Stiffeners 122 in the form of steel channel sections, shown in FIG. 1d, are welded, toes inward, intermittently along the outside face of side beam assembly 42 at locations corresponding to the junctions of cross beams, such as cross beam 52, and spines such as cross member 70.

At each end of railcar unit 22 loads carried in the floor and in the side beam assemblies 42 and 44 are transferred to and from either a railcar end connector 130 or an articulation end connector 131. There are two primary load paths. The first load path is from the connector into a stub sill 132, into a bolster 134 and a shear plate 136 and thence to beam assembly 42 or beam assembly 44. The second load path is from connector 130 or 131, through stub sill 132, along a downwardly curving and spreading stub sill neck 138 into a spreader plate 140 and thence through left and right hand struts 88 and 90 into floor assembly 50.

Care has been taken on each of these paths to reduce stress concentrations that had formerly been found disadvantageous. Considering FIG. 8b, which is typical, on the first path, lower side sill 116 and web 114 end at a smoothly curved transition flange 142 which extends to the longitudinal location of main body bolster 134. Similarly, welded to the top of each of side beam assemblies 40 and 42 is a tapered superior transition member 144 which extends from well beyond the transition of web 114 into beam assembly 40 or 42, to the end of beam assembly 40 or 42. This permits a deeper transition section over the wheel well allowance, and a correspondingly better stress distribution. Further, it permits, a deeper main bolster 134, and a deeper transition from side sill assemblies 40 and 42 to bolster 134, with lower stress levels generally, permitting a heavier loading generally. Superior transition member 144 carries loads to bolster 134 and into a reinforcing cross member 146 at the same level as male or female side bearing arms 148 or 150 and allows those sliders to be at a greater elevation from the rails, in turn permitting a heavier duty articulated truck with greater load bearing capacity.

Figure 6:
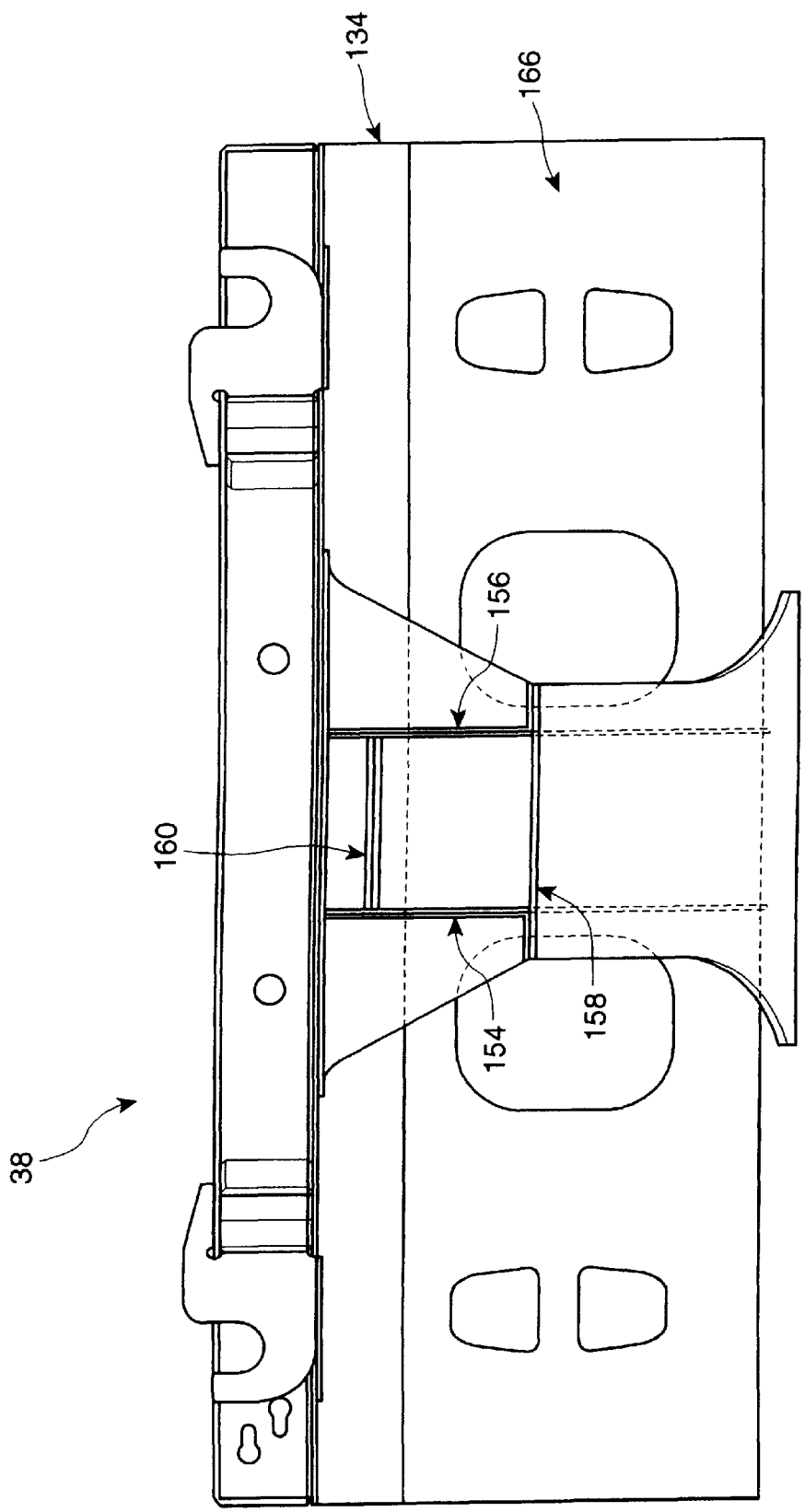
Figure 7:
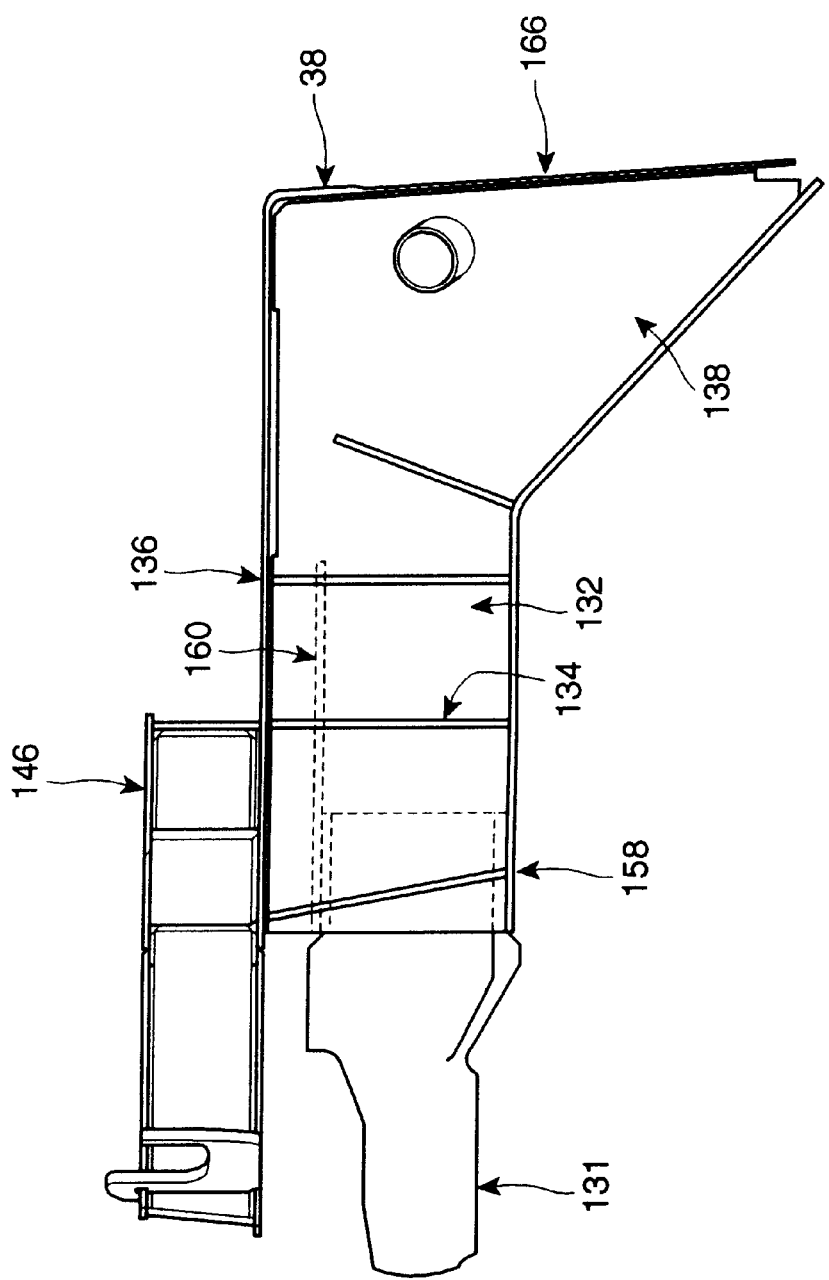
FIG. 7 shows a partial side view of the end structure of FIG. 6.

Examining FIG. 6 more closely, the skeleton members of articulated truck end structure 38 include main bolster 134, which extends laterally of stub sill 132. Stub sill 132 has a rectangular cross section formed by a pair of stub sill sides, 154 and 156, a bottom flange 158 which extends laterally beyond both stub sill sides, and a false flange 160 welded between sides 154 and 156 to form a socket for receiving the root of articulated connector 131. Sides 154 and 156 extend rearwardly to form the sides of neck 138. Bottom flange 158 also extends in a downwardly bent leg along the lower edges of sides 154 and 156 to form the forward face of neck 138. Shear plate 136 is welded across the top edges of stub sill sides 154 and 156 and the top of main bolster 134. The rearward edge of shear plate 136 is bent downwardly to form forward bulkhead 166 of the well of railcar first end unit 22. In the particular end structure shown, a pair of female side bearing arms are shown. Male sliders could have been shown instead without altering the principles of the invention provided that clearance for the corresponding female bearing arms of the adjacent railcar unit is maintained outboard of the male side bearing arms. Lateral reinforcing member 146 is mounted to shear plate 136 above bolster 134. Both lateral cross member 146 and bolster 134 have a longitudinal rake angle $\alpha$ yielding a tapered outboard extremity. This gives, in effect, a relief, indicated generally as 170. The male bolster and bolster reinforcement of the adjacent railcar unit also have an outboard relief, such that a brake valve 172 can be mounted in the space of the relief, at a height such that the uppermost extremity of brake valve 172 lies at a low enough level not to interfere with the bottom side of a highway trailer nose clearance envelope, whether that highway trailer nose is overhanging the end structure from the well of the same railcar unit or from the adjacent unit.

The brake system of the railcar unit are shown in FIGS. 3a, 3b, 4a and 4b, these drawings showing both the handbrake and pneumatic systems in dark lines. A 1¼" trainline is indicated as 174. It extends from a railcar end coupling 176 along the outside of side beam 42 to an articulation coupling 178, whence it is joined by a flexible hose 180 that is coupled to the adjoining trainline of the next articulated car unit. Brake valve 172 is mounted in relief 170 of bolster 134, one corner being fixed directly thereto, and another corner being mounted to a bracket 184 welded to female side arm 150. Bracket 184 is a chain hack. Each of the articulated ends of the car has a pair of chain hack to permit the articulated truck to be chained to the bodies of the adjacent well car units. This allows the truck to be picked up with the car clear of the wheels. This is convenient for changing out wheels.

A ¾" service reservoir brake line 188 joins, and permits communication between, brake valve 172 and auxiliary, or service reservoir 190. Service reservoir 190 is a 3500 cu. in. cylindrical canister mounted in service reservoir brackets 192 to the outer face of web 114 of side beam 42, falling at least partially within the profile of top chord member 106. Similarly, a ¾" emergency reservoir brake line 194 joins, and permits communication between, brake valve 172 and emergency reservoir 198, similarly mounted in emergency reservoir mounting brackets 200 in the shadow of top chord member 106 of side beam 44.

As noted above, the well car units each have well structures, like end unit well structure 40, that are suitable for carrying shipping containers or highway trailers, or a combination load. Each end of the unit is equipped with a trailer hitch 206 or 208 for receiving the king pin of a highway trailer. The decking adjacent to hitches 206 and 208 is kept clear of obstructions that could interfere with carriage of highway trailers.

The overall length of the three car unit articulated railcar of FIG. 1 between coupler centres is 191'-0 ½", and 188'-5" over the striker faces. A standard compound brake reservoir 248 and a standard brake valve 246 are shown mounted on the connector end of unit 26. The saddle bag placement of service and emergency brake reservoirs 190 and 198, as described above, on the outside faces of side beams 42 and 44 does not impinge upon the space envelope required to permit overlength highway trailers to be loaded in well 40. Similarly, the placement of brake valve 172, as shown, is such that its uppermost extremities lie clear of the highway trailer loading envelope, in rebate 170. Rebate 170 is sufficiently large that brake valve 172 does not impede the motion of the car units during turns on a 180' turn radius. The location of the brake reservoirs and brake valves in relatively close proximity to each other is convenient.

Top chord member 106 could also be formed as a three sided roll formed channel, or other shaped hollow or open section channel, surmounted with a reinforcing plate such as plate 110. An upwardly opening U-shaped channel with a with a thick plate welded across the toes to form a closed section is one such alternative embodiment. The use of a steel tube is considered advantageous since such tube are readily available, and require less fabrication effort on assembly.

Although the saddle bag reservoir configuration described is preferred, other configurations of brake reservoirs can be employed. For example, a larger number of reservoirs of smaller diameter could be mounted to shear plate 136, provided always that they do not interfere with clearance for the noses of the highway trailer types the railcar unit is designed to carry. Similarly, a single, long reservoir of the same, or similar, diameter to those shown (roughly 10½ inches) with an internal bulkhead, or partition, could be mounted to one or the other of side beams 40 or 42. Alternatively, two separate reservoirs, as shown, could be mounted to the same side of railcar unit 22. It would also be possible, depending on space restrictions, to mount the reservoirs inside the webs of the side beams, rather than outside, provided they could be adequately protected from clumsy loading of cargo into well 40. It is not necessary that reservoirs 190 and 198 be mounted on the same railcar unit. They could, for example be mounted on unit 24 and brake valve 172 mounted on unit 22. However, notwithstanding the existence of numerous other possible configurations, the more or less symmetrical saddle bag configuration, on the outside face of the side beam webs, with the top chords at least partially overhanging the reservoirs and with the reservoirs mounted to the same unit as the brake valve, is preferred for its simplicity, ease of installation, and access for servicing and maintenance.

Although the embodiment illustrated in FIG. 1c and described above is preferred, the principles of the present invention are not limited to this specific example which is given by way of illustration. It is possible to make other embodiments that employ the principles of the invention and that fall within its spirit and scope as defined by the following claims and their equivalents.

What is claimed is:

1. A railcar unit comprising:
   a pair of end structures mounted to railcar trucks and intermediate structure connecting said end structures; and
   a service brake reservoir and an emergency brake reservoir separately mounted to said railcar unit;
   said intermediate structure including a pair of side beams extending between said end structures, each of said beams having a top chord and a lower sill;
   a brake valve mounted to said railcar unit; and
   service and emergency brake reservoirs connected to said brake valve and mounted to at least one of said beams.

2. The railcar unit of claim 1 wherein said service reservoir is mounted to one of said side beams and said emergency reservoir is mounted to the other of said side beams.

3. The railcar unit of claim 1, wherein:
   each of said top chords is formed of a hollow section having an inboard portion and an outboard portion;
   each said beam has a web connected between said inboard portion and said lower sill, said web having an outboard face;
   at least one of said service reservoir and said emergency reservoir is mounted to one of said outboard faces and is at least partially overhung by said top chord.

4. A railcar unit for carrying at least one size of highway trailer having a nose and a set of wheels, said railcar unit comprising:
   a pair of end structures mounted to railcar trucks, and intermediate structure connecting said end structures;
   a service brake reservoir and an emergency brake reservoir separately mounted to said railcar unit;
   a well defined between said end structures for receiving the wheels of at least one size of highway trailer, such that the nose of the trailer overhangs one of said end structures, the size of the nose of that at least one size of highway trailer defining a highway trailer clearance envelope over one of said end structures;
   said railcar unit has a brake valve mounted to lie outside said envelope; and said service brake reservoir and said emergency brake reservoir each lie outside said envelope.

5. A rail road well car unit for carrying at least one size of highway trailer having a nose and a set of wheels, said well car unit comprising:

a pair of end structures mounted to railcar trucks and intermediate structure connecting said end structures, one of said end structures being an articulation end having an articulation connection;

a well defined between said end structures for receiving the wheels of at least one size of highway trailer, with the nose of said trailer overhanging said articulation end;

the size of the nose of the highway trailer defining a highway trailer clearance envelope over said articulation end;

said intermediate structure includes a pair of side beams extending between said end structures, each of said beams having a top chord, a lower sill, and a web extending between said top chord and said lower sill, each said web having an outboard face;

a stub sill for mounting an articulated connector, and a main bolster having arms extending laterally from said stub sill, at least one of said arms having a relief formed therein for accommodating a brake valve;

a brake valve mounted to said railcar unit at least partially within said relief and lying completely outside said envelope;

a service brake reservoir connected to said brake valve and mounted to said outboard face of one of said webs;

an emergency brake reservoir connected to said brake valve and mounted to said outboard face of the other of said webs;

said top chord of one said beam at least partially overhanging said service brake reservoir; and said top chord of the other said beam at least partially overhanging said emergency reservoir.

6. A well car unit of an articulated railcar having a length and being capable of carrying a highway trailer having a nose and a set of wheels, said well car unit comprising:

a pair of end structures, at least one of said end structures being an articulation connection end for connection to an articulation truck;

intermediate structure connecting said end structures;

a well defined between said end structures, said well being capable of receiving the wheels of at least one size of highway trailer in a position in which the nose of the trailer overhangs said articulation connection end, the sizes of the noses of the sizes of highway trailer which said well is capable of receiving defining a nose overhang clearance envelope relative to said articulation connection end;

a brake cylinder for actuating a brake of said well car unit;

a brake valve connected to control said brake cylinder, said brake valve being mounted to said well car unit within half the length of said well car unit from said articulation connection end;

a service brake reservoir connected to said brake valve;

an emergency brake reservoir connected to said brake valve; and said service and emergency brake reservoirs being mounted to said well car unit and lying outside said envelope.

7. The well car unit of claim 6, the envelope having a lowest boundary height relative to top of rail, wherein said service and emergency brake reservoirs are mounted at a height lower than the lowest boundary height of the envelope.

8. The well car of claim 6 wherein said service and emergency reservoirs are mounted separately to said well car unit.

9. The well car unit of claim 6 wherein said well car unit intermediate structure includes a pair of side beams extending longitudinally between said end structures to define sides of said well, and at least one of said service and emergency reservoirs is mounted to one of said side beams.

10. The well car unit of claim 6 wherein:

said intermediate structure of said well car unit includes a pair of side beams extending longitudinally between said end structures to define sides of said well;

said service reservoir is mounted to one of said sides; and said emergency reservoir is mounted to the other of said sides.

11. The well car unit of claim 6 wherein:

said intermediate structure of said well car unit includes a pair of side beams extending longitudinally between said pair of end structures to define sides of said well;

said beams each have an outboard face;

said service reservoir is mounted to said outboard face of one of said beams; and said emergency reservoir is mounted to said outboard face of the other of said beams.

12. The well car unit of claim 11 wherein:

each of said beams has a top chord, a lower sill and a web joining said top chord and said lower sill; and said top chord overhangs the one of said service and emergency reservoirs mounted to said beam.

13. The well car unit of claim 6 wherein said brake valve is mounted to one of said end structures and said reservoirs are mounted to said well car unit closer to said brake valve than to the other end structure.

14. An articulated railcar having at least two articulated railcar units sharing an articulation truck and each having a length and an articulation connection end connected to said truck wherein:

at least one of said railcar units is a well car unit having a well, and a pair of end structures at opposite ends of said well;

said well being capable of receiving the wheels of at least one size of highway trailer, the sizes of the noses of the sizes of highway trailer which the well is capable of receiving defining a nose overhang clearance envelope relative to said articulation connection ends of said railcar units;

at least one of said railcar units has a brake cylinder for operating a brake of said railcar;

at least one of said railcar units has a brake valve connected to control operation of said brake cylinder, said brake valve being mounted to said one railcar unit less than half the length of said railcar unit from said articulation connection end;

at least one of said railcar units has a service brake reservoir connected to said brake valve;

at least one of said railcar units has an emergency brake reservoir connected to said brake valve; and each of said brake valve, said service brake reservoir and said emergency brake reservoir is mounted to said railcar in a position lying outside said envelope.

15. The articulated railcar of claim 14 wherein said brake valve is mounted less than 175 feet from another brake valve mounted to said railcar.

* * * * *